United States Patent [19]

Martin et al.

[11] 4,260,317
[45] Apr. 7, 1981

[54] TELESCOPIC BODY WITH EJECTION BULKHEAD

[75] Inventors: Paul H. Martin, Willowdale; John C. Martin, Toronto, both of Canada

[73] Assignee: Diesel Equipment Limited, Toronto, Canada

[21] Appl. No.: 956,820

[22] Filed: Nov. 1, 1978

Related U.S. Application Data

[63] Continuation-in-part of Ser. No. 850,934, Oct. 3, 1977, abandoned.

[51] Int. Cl.³ ............................................. B60P 1/00
[52] U.S. Cl. .................................. 414/517; 280/656; 414/522
[58] Field of Search ............... 414/492, 522, 509–517; 298/1 B; 280/656

[56] References Cited

U.S. PATENT DOCUMENTS

| 1,794,318 | 2/1931 | Perkins et al. | 414/512 X |
| 2,663,439 | 12/1953 | Phelps | 414/522 |
| 3,827,753 | 8/1974 | Pitts | 414/517 X |

*Primary Examiner*—Robert G. Sheridan
*Attorney, Agent, or Firm*—Fetherstonhaugh & Co.

[57] ABSTRACT

A telescopic truck body incorporating an ejection bulkhead. The telescopic truck body consists of two sections telescoped one within the other. A movable bulkhead is located within the inner section of the telescopic body and a drive means is provided for driving the bulkhead longitudinally of the inner section as the inner section is driven with respect to the outer section. The drive is adapted to move the bulkhead longitudinally of the inner section so that it is located adjacent the discharge end thereof when the inner section is fully telescoped within the outer section.

9 Claims, 10 Drawing Figures

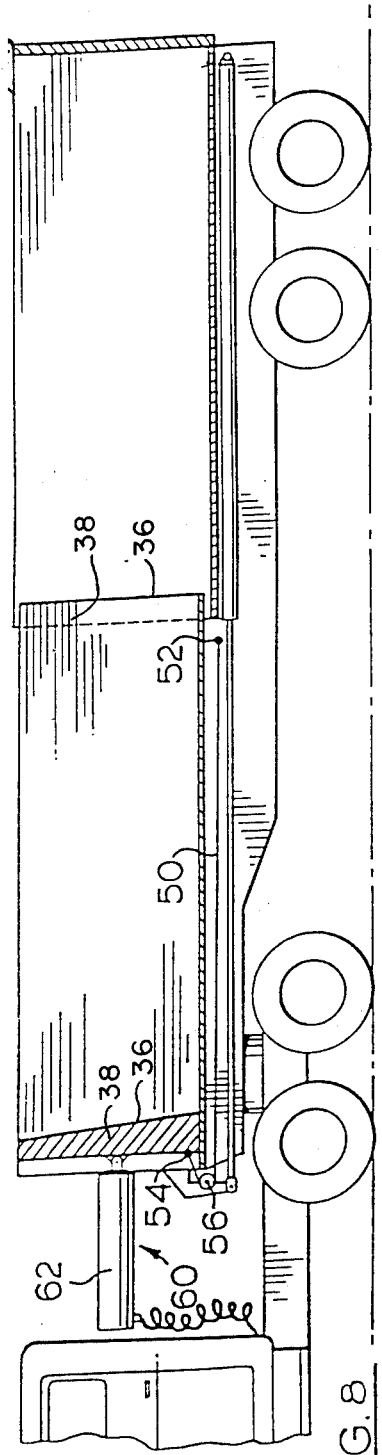
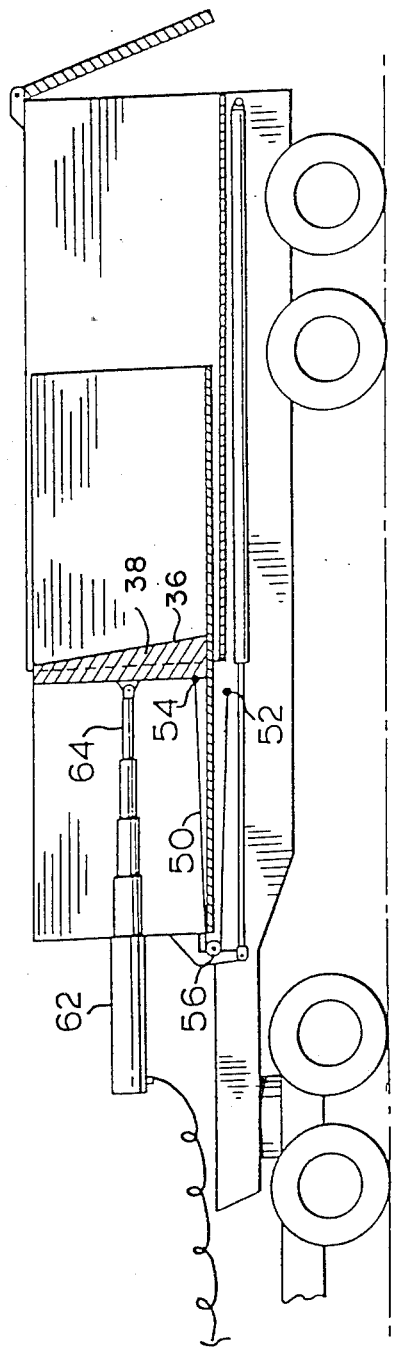
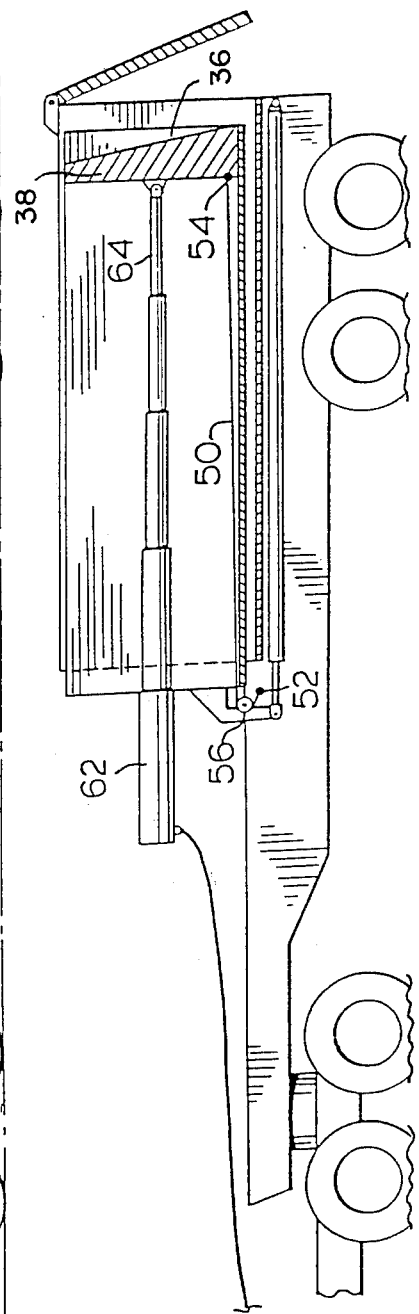

TELESCOPIC BODY WITH EJECTION BULKHEAD

The present application is a continuation-in-part of application Ser. No. 850,934 filed Oct. 3, 1977, which is now abandoned.

This invention relates to telescopic container bodies mountable on a truck frame and trucks having such container bodies. In particular, this invention relates to a telescopic container body which incorporates an ejection bulkhead and in which the ejection bulkhead is retained so as to move freely along the section in which it is driven by means of a plurality of flexible connector lines which also apply a telescoping drive to the container body.

PRIOR ART

British Pat. No. 760,130 describes a telescopic container body which incorporates a moving bulkhead which is drawn through the container body by flexible cables. In both of the embodiments the cables are shown extending in the container space. Experience has shown that to extend cables in the container space limits the nature of the load which can be carried by the container body to one which will not adversely interfere with the movement of the cables therethrough and the working life of the cables. While in the patent specification reference is made to the objective of providing a transmission for moving the bulkhead which will prevent substantial tilting of the bulkhead when subjected to uneven resistance to transverse or uneven loading over its surface, the double-acting push/pull transmission system which is disclosed is far from simple in that it requires a complex array of pulleys in order to permit each cable to have one end fastened to one face of the bulkhead and its other end fastened to the other face of the bulkhead so that the cables can pull the bulkhead to the discharge position and pull the bulkhead in the opposite direction to the extended position. It is believed that considerable difficulty would be experienced in operating this mechanism to achieve the objective of preventing tilting of the bulkhead as it is pulled along. The multiplicity of pulleys and lengths of cable which are required are such that considerable difficulty would be experienced in maintaining the mechanism in good working order.

Russian Pat. No. 274,057 discloses a telescoping container body which has a movable bulkhead in which separate power sources are provided for effecting the telescoping of the container body and for effecting the movement of the bulkhead. The duplication of power cylinders adds considerably to the cost of the mechanism. The Russian patent also discloses a complex telescoping guide mechanism for attempting to maintain alignment of the moving bulkhead.

The mechanism of the preferred embodiment of the present invention for effecting telescoping of the container body and movement of the bulkhead is less expensive than that of the Russian patent in that the drive mechanism which is used for movement of the bulkhead also effects a simultaneous movement of the container body to the contracted position, thereby eliminating one of the drive mechanisms of the Russian patent. Furthermore, the drive mechanism while providing for the simultaneous telescoping and movement of the bulkhead is substantially less complicated than that of the British patent described above in that all of the pulleys and cables required for pulling the bulkhead in the British patent have been eliminated and replaced by an extensible hydraulic drive mechanism.

It has been found that a most efficient movement of the bulkhead is achieved by pushing the bulkhead and transverse alignment of the bulkhead can be maintained by connecting the bulkhead to points at the front end of the outer section of the telescoping body which are held stationary by extending the cable around a guide which is carried by the front section and moves with the front section so that movement of the bulkhead and movement of the telescoping body occurs simultaneously.

SUMMARY OF INVENTION

According to one aspect of the present invention, a telescopic container body comprising an inner section and an outer section, the inner section being mounted in the outer section for movement with respect to the outer section between an extended position and a contracted position, the inner section and the outer section each having a front end and a back end, the back end of the inner section opening into the front end of the outer section, the back end of the outer section having means for permitting a load to be discharged therethrough, an ejection bulkhead mounted in said inner section and extending transversely thereacross, said ejection bulkhead being mounted for movement between a loading position disposed adjacent the front end of said inner section and a discharge position disposed adjacent the back end of said inner section, an extensible hydraulic drive assembly having a first end secured with respect to the front end of said inner section and a second end secured to said bulkhead, first guide means on said inner section adjacent the back end thereof, flexible connector line means connected at a first end thereof to said bulkhead and being secured at the other end thereof against movement in response to telescoping movement of said inner section with respect to said back section, said flexible connector means extending from the ejection bulkhead toward the front end of said inner section, around said first guide means and thereafter toward the front end of said outer section to be retained at a point adjacent the front end of said outer section whereby extension of said extensible hydraulic drive assembly drive said bulkhead relative to said inner section in a direction towards said discharge position and thereby moves said one end of said flexible connector means away from said first guide means to effect a simultaneous movement of said inner section with respect to said outer section in a direction toward said contracted position, and means for moving the telescopic container body to the extended position and simultaneously moving the ejection bulkhead to the loading position.

According to a further aspect of the present invention, a telescopic container body comprises an inner section and an outer section, the inner section being mounted in the outer section for movement with respect to the outer section between an extended position and a contracted position, the inner section and the outer section each having a front end and a back end, the back end of the inner section opening into the front end of the outer section, the back end of the outer section being adapted to open to permit a load to be discharged therethrough, an ejection bulkhead mounted in said inner section and extending transversely thereacross, said ejection bulkhead having a leading face directed toward the back end of said inner section and a trailing face directed toward the front end of said inner section, said ejection bulkhead being mounted for movement between a loading position disposed adjacent the front end of said inner section and a discharge position disposed adjacent the back end of said inner section, said bulkhead having at least three alignment anchor locations arranged at spaced points on said trailing face, imaginary lines drawn through adjacent spaced points defining the perimeter of a push area which is located inwardly thereof on said trailing face, an extensible hydraulic drive assembly having a first end secured with respect to the front end of said inner section and a second end secured to said trailing face of said bulkhead in said push area, said extensible hydraulic drive being operable to drive said bulkhead to and fro between said loading and discharge positions first guides on said inner section adjacent the back end thereof, a plurality of flexible connector lines each having a first end and a second end, said connector lines having their first ends connected to said bulkhead, one at each anchor point, said connector lines extending forwardly from their associated anchor points and around one of said first guides and thereafter extending rearwardly to be retained against movement with respect to said front section at points in the proximity of the position which the front end of the inner section is to be located wherein the inner section is in said contracted position, whereby extension of said extensible hydraulic drive assembly drives said bulkhead relative to said inner section in a direction toward said discharge position and the bulkhead draws the first ends of the flexible connector lines away from said first guide means to effect a simultaneous movement of said inner section with respect to said outer section in a direction toward said contracted position, said flexible connector lines being inextensible such that they maintain the transverse alignment of the bulkhead and thereby prevent binding of the bulkhead with respect to the inner section as it is driven therealong toward said discharge position, and means for moving the telescopic container body to the extended position to simultaneously move the ejection bulkhead to the loading position.

PREFERRED EMBODIMENT

The invention will be more clearly understood after reference to the following detailed specification read in conjunction with the drawings, wherein FIG. 1 is a diagrammatic side view of a telescopic container body showing a movable bulkhead in a loading position;

FIG. 8 is a diagrammatic side view of a telescopic container body illustrating an alternative guidance system of the bulkhead;

FIG. 9 is a diagrammatic side view of the container body of FIG. 8 showing the bulkhead in a second position; and FIG. 10 is a view similar to FIG. 9 showing the bulkhead in the ejection position.

Figure 1:
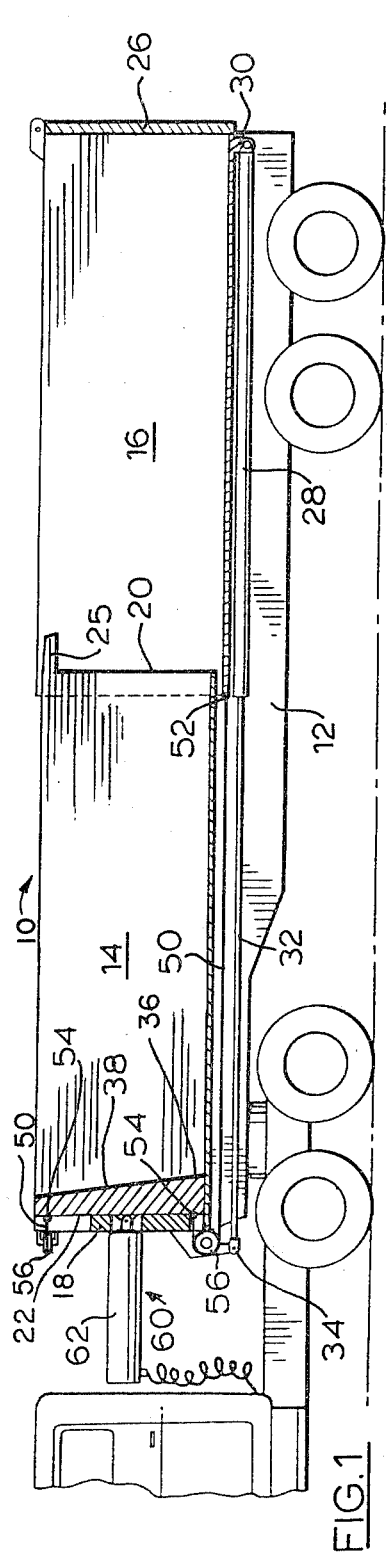

With reference to the drawings, the reference numeral 10 refers generally to a container body according to an embodiment invention. The telescopic container body is mounted on the frame 12 of a road-going vehicle such as a truck and is preferably self-contained. The telescopic container body consists of an inner section 14 and an outer section 16. The inner section 14 forms the front end of the container body when the container body is extended and is movable with respect to the outer section 16 between the extended loading position shown in FIG. 1 and the contracted discharge position shown in FIG. 3. The outer section 16 is secured with respect to the frame 12 by any conventional container body mounting structure. The inner section 14 has a transverse support 18 at the front end thereof. The back end 20 of the inner section 14 is open and opens into the front end of the outer section 16. A tailgate 26 is located at the back end 24 of the outer section 16. The tailgate 26 is hingedly mounted at its upper end to the back end 24 of the outer section 16 and serves to close the back end 24 of the outer section 16. The tailgate 26 is provided with a conventional locking mechanism (not shown) for locking it in the closed position. The tailgate 26 is automatically moved from the closed position to the open position by engagement with lugs 25 which project rearwardly from the back end of the inner section 14.

An ejection bulkhead 38 is mounted within the inner section 14 and extends transversely thereacross. The ejection bulkhead 38 has an inclined leading face 36 and a trailing face 22. An extensible hydraulic drive assembly 60 has a front section 62 mounted on the transverse support wall 18 so that it is fixed with respect to the inner section 14 and an outer section 64 connected to the trailing face 22 of the bulkhead 38. Expansion of the extensible hydraulic drive assembly 60 causes the bulkhead 38 to be moved from the retracted position shown in FIG. 1 to the extended position shown in FIG. 3.

To avoid the necessity of providing a separate powerful extensible hydraulic drive assembly for telescoping the inner section 14 with respect to the outer section 16 of the container body, a plurality of flexible connector lines 50 are provided and extend forwardly from anchor points 54 on the trailing face of the bulkhead 38 around guide pulleys 56 which are mounted on and movable with the inner section 14 at the front end thereof and thereafter the flexible connector lines extend rearwardly to the front end of the outer section 16 and are connected thereto at points 54. It will be noted that in extending rearwardly from the pulleys 56 to the front end of the outer body section, the cables extend outside the container space with the result that at no time do any of the cables extend within the load carrying space. It will also be noted that by reason of the fact that the points 52 are mounted on the outer section, the entire container body can be mounted on the frame 12 merely by means of conventional body mounting systems. Thus, it will be seen that none of the mountings for the flexible connector lines need be secured with respect to stationary frame members. It will, however, be apparent that the points 52 could be located on the frame 12 and may in fact be located rearwardly of the front end of the outer section 16. It is, however, important that the connector lines 50 extend to a point in close proximity to position which the front end of the inner section 14 will assume when the container body is telescoped to the position shown in FIG. 3 merely by the movement of the guide pulleys 56 resulting from the advancement of the bulkhead 38.

Figure 2:
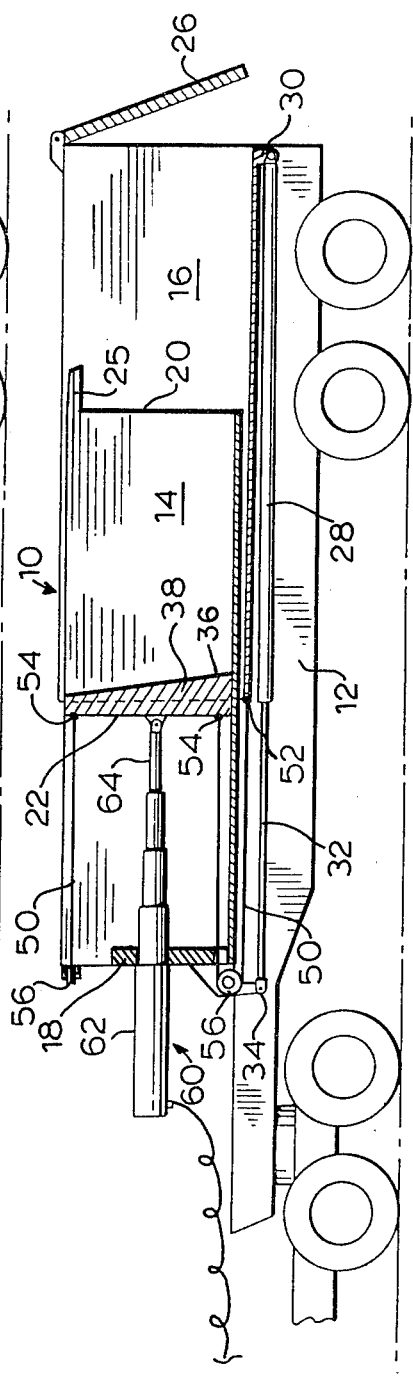
FIG. 2 is a side view similar to FIG. 1 showing the telescopic container body in an intermediate partially telescoped position.

With particular reference to FIG. 2 of the drawings, it will be noted that the flexible connector lines 50 extend forwardly from the trailing face of the bulkhead and are subjected to a tensile load greater than that required to move the inner section 14 with respect to the outer section 16. The flexible connector lines 50 act as a restraining harness which prevents transverse misalignment of the bulkhead as it is moved along the inner section.

If one side of the bulkhead 38 encountered a greater resistance to forward movement than the other side, the flexible connector lines 50 would not permit one side of the bulkhead to move in advance of the other side because it is impossible to extend one of the flexible connector lines 50 ahead of its associated guide pulley 56 further than any of the other flexible connector lines 50. To extend one flexible connector line 50 beyond another flexible connector line would require the inner section 14 of the container body to move out of alignment with the outer section 16 so that the pulleys 56 on one side of the container body could be located closer to their associated connecting points 52 on the front end of the outer section. The fact that the container body consists of only two long sections which are telescoped one within the other prevents such an occurrence, particularly when the sections are telescoped one within the other when moving from the extended position to the contracted position. Thus it will be seen that the simultaneous movement of the bulkhead and telescoping of the container body contributes to the maintenance of transverse alignment of the bulkhead.

It will be apparent from the foregoing that the extensible hydraulic assembly 60 is only useful for returning the bulkhead 38 to the retracted position and in order to return the container body to the extended position, a secondary hydraulic drive cylinder 28 is proved. The secondary hydraulic drive cylinder 28 is mounted on mounting lugs 30 which are secured to the outer section 16 at the back end thereof. A ram 32 projects from the outer end of the cylinder 28 and has its outer end secured at 34 with respect to the front end of the inner section 14. By activating the hydraulic cylinder 28 to extend the ram 32, the container body may be moved from the retracted position shown in FIG. 3 to the extended position shown in FIG. 1 and the bulkhead 38 will automatically be moved to the retracted position shown in FIG. 1, the hydraulic drive 60 having been previously vented.

The flexible connector lines 50 may be in the form of wire cables, rope belts or chains. If chains are used, the pulleys 56 would be in the form of sprockets.

In use, the container body is positioned as shown in FIG. 1 of the drawings to receive a load. The entire container body then may be loaded with any material capable of being discharged directly through the end of the container body. The container body may be used to transport granular materials or other semi-fluid materials.

In order to discharge a load at a job site, the tailgate locking mechanism is released and hydraulic fluid is supplied to the extensible hydraulic drive 60. The hydraulic drive 60 begins its extension and moves the bulkhead 38 rearwardly to displace the load toward the discharge end. Simultaneously the inner section 14 is telescoped with respect to the outer section. The movement of the bulkhead and the telescoping continues until the container body is in the position shown in FIG. 3 in which the entire load has been discharged.

Figure 3:
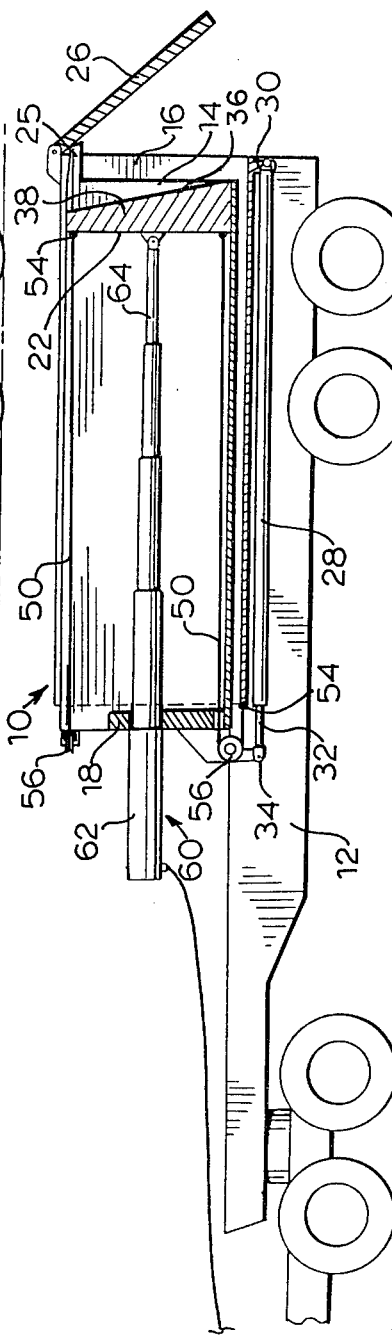
FIG. 3 is a diagrammatic side view similar to FIG. 2 showing the telescopic container body in the fully telescoped position.
Figure 4:
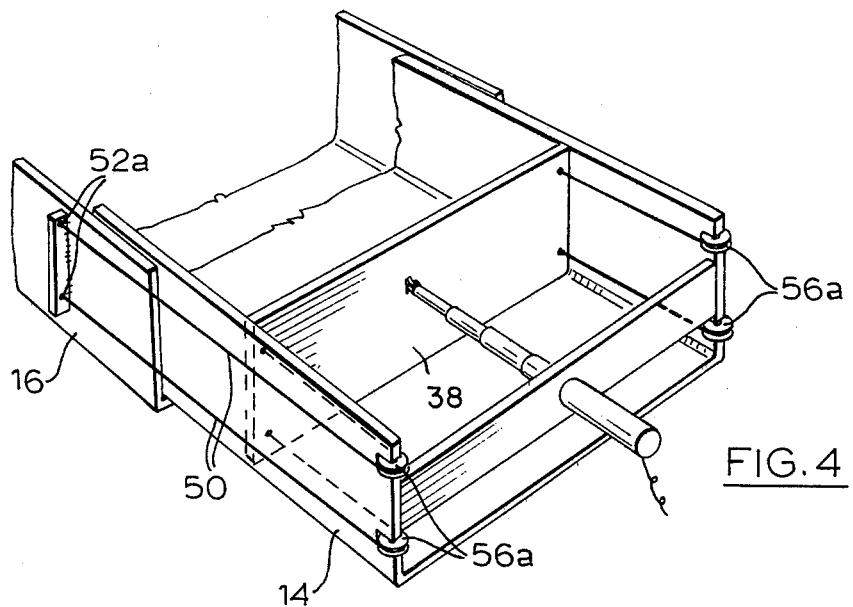
FIG. 4 is a pictorial side view of a container body constructed in accordance with a further embodiment of the present invention showing four flexible connector lines connected to the bulkhead.

Various modifications of the structure illustrated in FIGS. 1, 2 and 3 of the drawings will be apparent to those skilled in the art. FIG. 4 illustrates an alternative construction in which the flexible connector lines extend around guides 56a and are disposed in an outwardly overlying relationship with respect to the side walls of the container body and are secured at connecting points 52a to the sides of the back section 16. It will be noted that the points 52a are spaced a substantial distance rearwardly from the front end of the outer section 16, the important point being that the cables extend from the guides 56a at least as far as the front end of the outer section 16.

Figure 6:
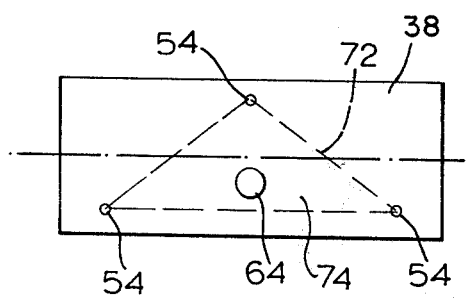
FIG. 6 is a view similar to FIG. 5 showing three alignment anchor locations arranged in a triangular configuration.
Figure 5:
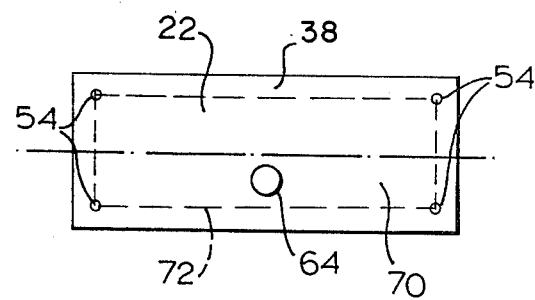
FIG. 5 is a front view of the trailing face of the bulkhead showing four alignment anchor locations arranged in a generally rectangular configuration.
Figure 7:
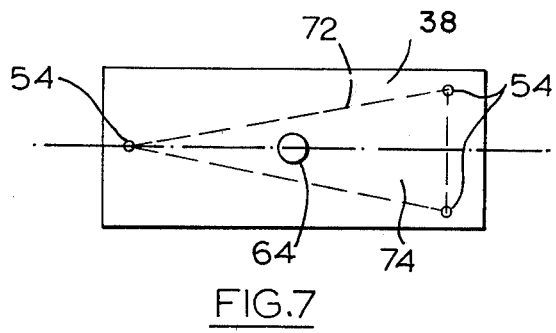
FIG. 7 is a view similar to FIG. 6 showing three alignment anchor locations arranged in a triangular configuration.

To ensure that the connector lines 50 operate efficiently to retain the transverse alignment of the bulkhead, the moving end of the hydraulic cylinder unit 60 is connected to the trailing face 22 of the bulkhead in a pushing area 70 which lies within the confines of imaginary lines 72 drawn between adjacent anchor points 54, as shown in FIGS. 5, 6 and 7 of the drawings. In the embodiment shown in FIG. 5 of the drawings, the anchor points 54 are arranged in a generally rectangular configuration so that the pushing area 70 is also of a generally rectangular configuration. While the connector lines 50 will be effective when the hydraulic drive assembly is connected at any point within the confines of the pushing area, the outer end portion 64 of hydraulic cylinder 60 is preferably connected to the bulkhead at a level below half the height of the bulkhead. FIG. 6 shows an alternative arrangement wherein the anchor locations 54 are arranged in a generally triangular configuration with two of the connections being located toward the lower edge and one location being located toward the upper edge of the bulkhead. FIG. 7 shows a further alternative wherein the anchor connections 54 are located two on one side and one on the other side of the hydraulic cylinder arm 64.

FIGS. 8 to 10 serves to illustrate an alternative drive mechanism which does not employ the preferred arrangement of anchor points. In this embodiment only two anchor points 54 are provided and these anchor points are arranged on adjacent each side of the movable bulkhead. While the preferred form of mounting of the anchor points has proven to be particularly advantageous, the arrangement shown in FIGS. 8, 9 and 10 of the drawings will operate satisfactorily. In applications where the load which is to be discharged is easily discharged from the container body no additional guidance is required for the bulkhead. In other applications, however, additional guidance may be provided in the form of the preferred arrangement of anchor points and cables.

Various other modifications will be apparent to those skilled in the art without departing from the scope of the invention. For example, while in the container body described in FIGS. 1, 2 and 3 of the drawings, the body is provided with a tailgate 26 it will be understood that the ejection mechanism of the present invention is applicable to container bodies which do not have a tailgate and are open at the back end and to bodies which have alternative forms of discharge openings at the back end thereof. Furthermore, it will be understood that while the bulkhead is illustrated as having an inclined leading face, the mechanism of the present invention is capable of moving the bulkhead over the full length of the inner section with the result that the leading face may be vertically oriented or may have any preferred configuration which will assist the discharging of the load. In a further modification the hydraulic cylinder 28 which is used for the purpose of extending the container body may be replaced by a power operated winch or the like which may be connected by means of a cable to the front end of the inner section of the container body. In addition, it will be noted that while only one main hydraulic cylinder 62 is shown as providing the main drive for moving the bulkhead to the discharge position this one cylinder could be replaced by two or more cylinders. Furthermore, the main drive cylinder or cylinders need not be arranged to extend on a longitudinal axis of the container body but may articulate during their extension and contraction. The cylinders may have one end hinged at points arranged on opposite sides of the front end of the container body and their other end connected to the bulkhead at points spaced inwardly from the side edges thereof. The cylinders will then articulate when expanded and contracted and in the contracted configuration they may extend substantially parallel to the bulkhead thereby avoiding the necessity of providing a large gap between the front end of the front section of the container body and the cab of the vehicle.

Furthermore, it should be noted that while the container body of the present invention is illustrated as being mounted on the frame of a truck or the like, the body might also be of a frameless construction. A frameless construction would be achieved by extending the outer section 16 so that it extends over substantially the full extended length of the container body, that is to say, to a point adjacent the front wall 18 of the inner section 14 when the container body if arranged in the position illustrated in FIG. 1 of the drawings. In such an application ground engaging wheels may be mounted directly on the underside of the outer section 16 so that the container body is frameless. These and other modifications of the illustrated embodiments will be apparent to those skilled in the art.

What I claim as my invention is:

1. A telescopic container body comprising;
(a) an inner section and an outer section, the inner section being mounted in the outer section for movement with respect to the outer section between an extended position and a contracted position, the inner section and the outer section each having a front end and a back end, the back end of the inner section opening into the front end of the outer section, the back end of the outer section having means for permitting a load to be discharged therethrough.
(b) an ejection bulkhead mounted in said inner section and extending transversely thereacross, said ejection bulkhead being mounted for movement between a loading position disposed adjacent the front end of said inner section and a discharge position disposed adjacent the back end of said inner section,
(c) an extensible hydraulic drive assembly having a first end secured with respect to the front end of said inner section and a second end secured to said bulkhead,
(d) first guide means on said inner section adjacent the back end thereof,
(e) flexible connector line means connected at a first end thereof to said bulkhead and being secured at the other end thereof against movement in response to telescoping movement of said inner section with respect to said back section, said flexible connector means extending from the ejection bulkhead toward the front end of said inner section, around said first guide means and thereafter toward the front end of said outer section to be retained at a point adjacent the front end of said outer section whereby extension of said extensible hydraulic drive assembly drive said bulkhead relative to said inner section in a direction towards said discharge position and thereby moves said one end of said flexible connector means away from said first guide means to effect a simultaneous movement of said inner section with respect to said outer section in a direction toward said contracted position, and
(f) means for moving the telescopic container body to the extended position and simultaneously moving the ejection bulkhead to the loading position.

2. A telescopic container body comprising:
(a) an inner section and an outer section, the inner section being mounted in the outer section for movement with respect to the outer section between an extended position and a contracted position, the inner section and the outer section each having a front end and a back end, the back end of the inner section opening into the front end of the outer section, the back end of the outer section being adapted to open to permit a load to be discharged therethrough,
(b) an ejection bulkhead mounted in said inner section and extending transversely thereacross, said ejection bulkhead having a leading face directed toward the back end of said inner section and a trailing face directed toward the front end of said inner section, said ejection bulkhead being mounted for movement between a loading position disposed adjacent the front end of said inner section and a discharge position disposed adjacent the back end of said inner section, said bulkhead having at least three alignment anchor locations arranged at spaced points on said trailing face, imaginary lines drawn through adjacent spaced points defining the perimeter of a push area which is located inwardly thereof on said trailing face,
(c) an extensible hydraulic drive assembly having a first end secured with respect to the front end of said inner section and a second end secured to said trailing face of said bulkhead in said push area, said extensible hydraulic drive assembly being operable to drive said bulkhead to and fro between said loading and discharge positions,
(d) first guides on said inner section adjacent the back end thereof,
(e) a plurality of flexible connector lines each having a first end and a second end, said connector lines having their first ends connected to said bulkhead, one at each anchor point, said connector lines extending forwardly from their associated anchor points and around one of said first guides and thereafter extending rearwardly to be retained against movement with respect to said front section at points in the proximity of the position in which the front end of the inner section is to be located when the inner section is in said contracted position, whereby extension of said extensible hydraulic drive assembly drives said bulkhead relative to said inner section in a direction toward said discharge position and the bulkhead draws the first ends of the flexible connector lines away from said first guide means to effect a simultaneous movement of said inner section with respect to said outer section in a direction toward said contracted position, said flexible connector lines being inextensible such that they maintain the transverse alignment of the bulkhead and thereby prevent binding of the bulkhead with respect to the inner section as it is driven therealong toward said discharge position, and (f) means for moving the telescopic container body to the extended position to simultaneously move the ejection bulkhead to the loading position.

3. A telescopic container body as claimed in claim 2 wherein four anchor points and four flexible connector lines are provided, the anchor points being arranged two above and two below and two on one side and two on the other side of said extensible hydraulic drive assembly.

4. A telescopic container body as claimed in claim 3 wherein said first end of said hydraulic drive assembly is connected to said bulkhead substantially centrally of the width thereof.

5. A telescopic container body as claimed in claim 4 wherein said hydraulic drive assembly is connected to said bulkhead below half the height thereof above the bottom wall of the inner section.

6. A telescopic container body as claimed in claim 5 wherein said second ends of said connector lines are anchored to said outer section whereby said container body can be pre-assembled and made operative for telescoping and movement of said bulkhead prior to mounting the container body on a frame, thus permitting the container body to be transported in a shortened configuration.

7. A telescopic container body as claimed in claim 2 wherein said flexible connector lines are flexible cables.

8. A telescopic container body as claimed in claim 2 wherein said first guides are pulleys.

9. A telescopic container body as claimed in claim 2 wherein said flexible connector lines extend from said guide means to said points in the proximity of the front end of the outer section along paths disposed outwardly from said inner section.

* * * * *